United States Patent Office 2,847,465
Patented Aug. 12, 1958

2,847,465

PRODUCTION OF ALPHA HYDROXYISOBUTYRIC ACID

Nat C. Robertson, Wellesley, and Thomas R. Steadman, Waban, Mass., assignors to Escambia Chemical Corporation, Pace, Fla., a corporation of Delaware No Drawing. Application January 15, 1957
Serial No. 634,148

10 Claims. (Cl. 260—533)

This invention relates to the production of valuable chemicals and in particular to the production of alpha hydroxyisobutyric acid and derivatives thereof. This application is, in part, a continuation of our copending applications Serial No. 371,898, filed August 3, 1953, now abandoned, and Serial No. 418,678, filed March 25, 1954, now abandoned.

A principal object of the present invention is to provide an economical integrated process for making methacrylic acid and esters thereof from isobutylene.

Another object of the invention is to provide an improved process for the production of the valuable intermediate compound alpha hydroxyisobutyric acid.

Still another object of the invention is to provide a process for converting isobutylene to esters of alpha hydroxyisobutyric acid.

Other objects of the invention will in part be obvious and will in part appear hereinafter.

The invention accordingly comprises the process involving the several steps and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

The production of methacrylic acid and its esters has in the past involved relatively complex procedures and has required the use of relatively expensive starting materials. In the present invention, isobutylene, which is relatively plentiful and cheap, is utilized as the starting material for the production of alpha hydroxyisobutyric acid and derivatives thereof.

A particular aspect of the present invention is directed to the conversion of isobutylene to alpha hydroxyisobutyric acid by means of nitric acid and water. The resultant alpha hydroxyisobutyric acid may subsequently be dehydrated and/or esterified to methacrylic acid or suitable esters thereof.

The reaction between isobutylene and nitric acid preferably takes place when a quantity of nitric acid in excess of the stoichiometric amount required to convert the isobutylene to alpha hydroxyisobutyric acid is employed. In one preferred embodiment of the invention, the mole ratio of nitric acid to isobutylene is maintained on the order of 2:1 or higher. Nitric acid with an $HNO_3$ concentration of from 50% to 100% by weight has been found to be preferable. This reaction is preferably carried out at relatively low temperatures and, in particular, at temperatures below about 50° C. The reaction mixture of products resulting from the above reaction are preferably subjected to hydrolysis conditions so as to produce predominantly alpha hydroxyisobutyric acid. In one preferred embodiment of the invention, the hydrolysis is accomplished by treating the isobutylene-nitric acid reaction mixture with water.

Specific detailed methods of practicing the present invention are set forth in the following nonlimiting examples which are directed more specifically to the step of converting isobutylene to alpha hydroxyisobutyric acid.

Example I 300 grams of 70% nitric acid, 5 mls. of nitrogen dioxide ($NO_2$) as an initiator, and about 0.10 gram of ammonium meta vanadate catalyst were charged to a reaction vessel. The reaction mixture was heated to between about 35°–40° C. After which time isobutylene was slowly bubbled through. 23 grams of isobutylene were added to the reaction mixture over a period of about 2 hours while maintaining the temperature below about 50° C. After all the isobutylene had been fed, the reaction mixture was allowed to stand for about 16 hours at room temperature (25° C.).

The resulting mixture was distilled in a vacuum to remove the nitric acid. An equal volume of water was mixed with the residue and a considerable quantity of heat was evolved from the mixture during this water treatment. Water was then distilled off and a second quantity of water was again added to the residue. After nearly all of this water was removed by vacuum distillation, the residue solidified. The solid residue was dissolved in benzene and freed of a small residual amount of water by azeotropic distillation. The dry benzene solution was evaporated to a small volume, cooled, and a crop of crystals amounting to 10.8 grams was obtained. The yield of alpha hydroxyisobutyric acid was thus 25% based on the original quantity of isobutylene fed to the reactor.

Example II 250 grams of 70% nitric acid, 5 mls. of nitrogen dioxide ($NO_2$) as an initiator, and about 0.5 gram of cupric nitrate and 0.5 gram of manganous nitrate were charged to a reaction vessel. The acid mixture was heated to between 35° C.–40° C. and the isobutylene was slowly bubbled in. A total of 27.6 grams of isobutylene were added to the reaction mixture over a period of about 2 hours while maintaining the temperature below about 40° C. After all the isobutylene had been allowed, the reaction mixture was allowed to stand for about 21 hours at room temperature (25° C.).

The resulting mixture was distilled in a vacuum to remove the nitric acid. An equal volume of water was mixed with the residue which then became very warm. Water was distilled off and a second quantity of water was again added to the residue. After most of the water had been removed by vacuum distillation, the residue was redissolved in water and extracted with ether. The ether was evaporated from the extract, and the residue was dissolved in benzene and freed of water by azeotropic distillation. The dry benzene solution was evaporated to a small volume, cooled, and a crop of crystals of alpha hydroxyisobutyric acid amounting to 13.15 grams was obtained. The yield of alpha hydroxyisobutyric acid was thus 25.7% based on the original quantity of isobutylene fed to the reactor.

Example III 623 grams of 90% nitric acid and about 0.10 gram of ammonium meta vanadate catalyst were charged to a reaction vessel. The reaction mixture was cooled to about 15° C., after which time isobutylene was slowly bubbled through. 57.5 grams of isobutylene were added to the reaction mixture as it was stirred over a period of about 7 hours while maintaining the temperature below about 15° C. After all the isobutylene had been fed, the reaction mixture was allowed to stand for about 16 hours at room temperature (25° C.).

The resulting mixture was distilled in a vacuum to remove nitric acid and nitrogen oxides. An equal volume of water was mixed with the residue. Water was distilled off and a second quantity of water was again added to the residue. After the water had been removed by vacuum distillation, the residue was dissolved in ether and dried with sodium sulfate. The ether was evaporated from the extract and the residue was dissolved in benzene. The benzene solution was evaporated to a small volume, cooled, and a crop of crystals of alpha hydroxyisobutyric acid amounting to 32.4 grams was obtained. The remaining benzene was distilled off and an aliquot of the residual oil was treated with zinc acetate in acetic acid. 7.13 grams of alpha hydroxyisobutyric acid were recovered as its zinc salt. The yield of alpha hydroxyisobutyric acid was thus 32.6% based on the original quantity of isobutylene fed to the reactor.

*Example IV*

560 grams of 100% nitric acid were charged to a reaction vessel. No catalyst was employed in this run. The acid was cooled to about 15° C., after which time isobutylene was slowly bubbled through. 59.5 grams of isobutylene were adedd to the nitric acid as it was stirred over a period of about 5 hours while maintaining the temperature below about 15° C. After all the isobutylene had been fed, the reaction mixture was allowed to stand for about 16 hours at room temperature (25° C.).

The resulting mixture was distilled in a vacuum to remove nitric acid and nitrogen oxides. An equal volume of water was mixed with the residue. Water was distilled off and a second quantity of water was again added to the residue. After the water had been removed by vacuum distillation, the residue was taken up in ether and dried with sodium sulfate. The ether was evaporated from the extract and the residue was dissolved in benzene. The benzene solution was evaporated to a small volume, cooled, and a crop of crystals of alpha hydroxyisobutyric acid amounting to 10.6 grams was obtained. The remaining benzene was distilled off and the residual oil was added at room temperature to a 10% aqueous solution of potassium hydroxide. The mixture was then refluxed at 100° C. for about 5 hours. The resulting mixture was acidified with phosphoric acid and then continuously extracted with ether. The ether was evaporated from the extract and the residue was dissolved in benzene. The benzene was evaporated to a small volume, cooled, and a crop of crystals of alpha hydroxyisobutyric acid amounting to 29.6 grams was obtained. The yield of alpha hydroxyisobutyric acid was thus 36.4% based on the original quantity of isobutylene fed to the reactor.

The conversion of isobutylene will take place when at least the stoichiometric amount of nitric acid required for the reaction is employed, i. e., the mole ratio of nitric acid to isobutylene is at least 1:1. However, better results have been obtained when the nitric acid is used in excess over the stoichiometric amount needed to convert isobutylene to alpha hydroxyisobutyric. It is preferable, therefore, to maintain the mole ratio of nitric acid to isobutylene on the order of 2:1 or higher. The nitric acid in the present invention not only reacts with the isobutylene but also serves as a solvent for the reaction. Nitric acid with an $HNO_3$ concentration of from 50% to 100% has been found to be preferable, the yield increasing with the concentration of the nitric acid.

The reaction can be initiated either by adding a little nitrogen dioxide ($NO_2$) at the start of the reaction, or by heating a small portion of the reaction mixture itself to a temperature on the order of 50° C. so as to reduce the nitric acid sufficiently to form a little nitrogen dioxide. However, the use of initiators is not required as illustrated in Examples III and IV.

The reaction is carried out at a temperature in the range of 0° C. or somewhat below to 50° C. The preferred reaction temperature within this range depends to a great extent upon the concentration of the nitric acid employed. Generally, it has been found that highly concentrated nitric acid, e. g., 80% or above, permits lower reaction temperatures, whereas nitric acid with a concentration of below about 80% requires somewhat higher reaction temperatures. The time of reaction may be varied so that, for example, very much shorter periods than those given in the examples are satisfactory.

The reaction can be carried out in the presence of a catalyst. Small quantities of ammonium meta vanadate or vanadium pentoxide, when added to the reaction, have been found to be satisfactory as catalysts. Other suitable catalysts are mixtures containing dissolved copper salts and/or manganese salts. A vanadium pentoxide catalyst is preferable, however, as it does not react with the product to give insoluble materials. The reaction also proceeds smoothly and efficiently in the absence of any catalysts, as is illustrated in Example IV.

The feed material need not comprise pure isobutylene. It is possible to use a cheap mixture of isobutane and isobutylene, and it has been found that isobutane does not react under these conditions.

Upon completion of the addition of the reactants, the reaction mixture is distilled under reduced pressure to remove any nitric acid and nitrogen oxides present. The reaction mixture or products, substantially free of nitric acid, is then preferably subjected to one or more treatments with either water and/or bases and/or acids. The reaction mixture resulting from the reaction between isobutylene and nitric acid is believed to be a mixture containing therein alpha nitratoisobutyric acid and alpha hydroxyisobutyric acid. The alpha nitratoisobutyric acid is capable of being converted by hydrolysis to the desired hydroxy acid. This hydrolysis step can be accomplished by means of water as shown in the examples or by the use of bases, such as sodium hydroxide, potassium hydroxide and the like, and acids, such as phosphoric acid, sulfuric acid and the like, as more fully described in the copending application of Gardner, Serial No. 634,147, filed on even date herewith. Thus in the absence of any hydrolysis of the reaction mixture, there can be recovered therefrom alpha nitratoisobutyric acid, alpha hydroxyisobutyric acid, and mixtures thereof.

The alpha hydroxyisobutyric acid obtained may be subsequently esterified or dehydrated or subjected to both an esterification and a dehydration. If esters of alpha hydroxyisobutyric acid are desired, then the alpha hydroxyisobutyric acid can be simply esterified with a suitable alcohol such as the aliphatic alcohols, methanol, ethanol, propanol, the butanols and the like. Such esters may be produced by the general procedures described by Clinton and Laskowski, "Journal of American Chemical Society" 70, 3135 (1948) and in U. S. Patents 1,775,636, 2,336,317 and 2,348,710. If methacrylic acid is the desired end product, then the alha hydroxyisobutyric acid or an ester thereof can be simply dehydrated. For example, methyl alpha hydroxyisobutyrate may be dehydrated to a mixture of methacrylic acid and methyl methacrylate. Likewise, if an ester of methacrylic acid is desired, then the alpha hydroxyisobutyric acid may be esterified with a suitable alcohol and the ester dehydrated. For example, alpha hydroxyisobutyric acid may be esterified with methanol and then dehydrated so as to produce methyl methacrylate. The dehydration may be accomplished by means of $P_2O_5$ or by any of the procedures shown in British Patent 409,733, or in U. S. Patents 1,993,089, 2,054,242, 2,199,993, 2,184,934, 2,226,645, 2,244,389, and 2,356,247.

Since certain changes may be made in the above process without departing from the scope of the invention herein involved, it is intended that all matter contained in the above description shall be interpreted as illustrative and not in a limiting sense.

What is claimed is:

1. The process for the production of alpha hydroxyisobutyric acid which comprises reacting isobutylene at a temperature below about 50° C. with nitric acid having an HNO₃ concentration in excess of 50% by weight, the mole ratio of nitric acid to isobutylene being at least 1 to 1, treating the resultant reaction mixture with water, and recovering alpha hydroxyisobutyric acid.

2. The process for the production of alpha hydroxyisobutyric acid which comprises reacting isobutylene at a temperature below about 50° C. with nitric acid having an HNO₃ concentration in excess of 50% by weight, the mole ratio of nitric acid to isobutylene being maintained in excess of 2 to 1, treating the resultant reaction mixture with water, and recovering alpha hydroxyisobutyric acid.

3. The process for the production of alpha hydroxyisobutyric acid which comprises reacting isobutylene at a temperature below about 50° C. with nitric acid having an HNO₃ concentration in excess of 50% by weight in the presence of a catalyst selected from the group consisting of the salts of vanadium, manganese, copper and mixtures thereof, the mole ratio of nitric acid to isobutylene being maintained in excess of 1 to 1, treating the resultant reaction mixture with water, and recovering alpha hydroxyisobutyric acid.

4. The process of claim 3 wherein said catalyst comprises vanadium pentoxide.

5. The process of claim 3 wherein said catalyst comprises ammonium meta vanadate.

6. The process of claim 3 wherein said catalyst comprises a mixture of manganese nitrate and copper nitrate.

7. The process for the production of alpha hydroxyisobutyric acid which comprises reacting isobutylene at a temperature below about 50° C. with nitric acid having an HNO₃ concentration in excess of 50% by weight in the presence of an initiator comprising nitrogen dioxide, the mole ratio of nitric acid to isobutylene being at least 1 to 1, treating the resultant reaction mixture with water, and recovering alpha hydroxyisobutyric acid.

8. The process for the production of alpha hydroxyisobutyric acid and alpha nitratoisobutyric acid which comprises reacting isobutylene at a temperature below about 50° C. with nitric acid having a HNO₃ concentration in excess of 50% by weight, the mole ratio of nitric acid to isobutylene being at least 1 to 1, and recovering an acid selected from the group consisting of alpha hydroxyisobutyric acid, alpha nitratoisobutyric acid and mixtures thereof.

9. The process for the production of alpha hydroxyisobutyric acid which comprises reacting isobutylene at a temperature below about 50° C. with nitric acid having an HNO₃ concentration in excess of 50% by weight, the mole ratio of nitric acid to isobutylene being at least 1 to 1, recovering alpha nitratoisobutyric acid from the resulting reaction mixture, and hydrolyzing said alpha nitratoisobutyric acid to alpha hydroxyisobutyric acid.

10. The process for the production of alpha hydroxyisobutyric acid which comprises reacting isobutylene at a temperature below about 50° C. with nitric acid having an HNO₃ concentration in excess of 50% by weight, the mole ratio of nitric acid to isobutylene being at least 1 to 1, subjecting the resultant reaction mixture to hydrolysis conditions, and recovering alpha hydroxyisobutyric acid.

References Cited in the file of this patent

UNITED STATES PATENTS

| | | |
|---|---|---|
| 2,267,377 | Olin et al. | Dec. 23, 1941 |
| 2,298,387 | Kenyon et al. | Oct. 13, 1942 |
| 2,356,247 | Kirk et al. | Aug. 24, 1944 |
| 2,360,820 | Kropa | Oct. 24, 1944 |
| 2,525,353 | Himel | Oct. 10, 1950 |

OTHER REFERENCES

Degering et al.: J. A. C. S., vol. 73 (1951), pp. 848–9.
Beilstein: Band I (1918), p. 480.
Haitinger: Ann. Chim. (Liebig), 193 (1878), p. 382.
Levy et al.: J. Chem. Soc. (London) (1948), p. 54.
Klemenc: Chem. Abs., vol. 42 (1948), p. 6221.
Wurtz: Ann. Chim. (Liebig), 107 (1858), p. 198.
Poni: Chem. Zentralblat (1902), II, p. 16.
Michael et al. J. A. C. S., vol. 57 (1935), pp. 1268–76.
Groggins: Unit Processes, 4th ed. (1952), pp. 425–6.

UNITED STATES PATENT OFFICE

CERTIFICATE OF CORRECTION

Patent No. 2,847,465                                        August 12, 1958

Nat C. Robertson et al.

It is hereby certified that error appears in the above numbered patent requiring correction and that the said Letters Patent should read as corrected below.

The present sheets of drawings, headed by Patent No. 2,847,485, for J. Van Dyck Fear, was inadvertently inserted in the official grant (only) of Letters Patent No. 2,847,465 and should be canceled; in the printed specification, column 2, line 43, for "allowed", first occurrence, read -- added --; column 3, line 23, for "adedd" read -- added --; line 58, after "hydroxyisobutyric" insert -- acid --.

Signed and sealed this 25th day of November 1958.

(SEAL)

Attest:
KARL H. AXLINE
Attesting Officer

ROBERT C. WATSON
Commissioner of Patents